United States Patent
Ono et al.

(10) Patent No.: US 9,259,973 B2
(45) Date of Patent: Feb. 16, 2016

(54) HEAVY DUTY TIRE

(75) Inventors: Hiroaki Ono, Kodaira (JP); Masaharu Fukushima, Musashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 888 days.

(21) Appl. No.: 12/919,588

(22) PCT Filed: Jan. 27, 2009

(86) PCT No.: PCT/JP2009/051263
§ 371 (c)(1),
(2), (4) Date: Sep. 21, 2010

(87) PCT Pub. No.: WO2009/107436
PCT Pub. Date: Sep. 3, 2009

(65) Prior Publication Data
US 2011/0005652 A1  Jan. 13, 2011

(30) Foreign Application Priority Data

Feb. 27, 2008  (JP) .................. 2008-046042
Dec. 2, 2008  (JP) .................. 2008-307452

(51) Int. Cl.
*B60C 11/04* (2006.01)
*B60C 11/117* (2006.01)
(Continued)

(52) U.S. Cl.
CPC ......... *B60C 11/0309* (2013.04); *B60C 11/0311* (2013.04); *B60C 11/042* (2013.04);
(Continued)

(58) Field of Classification Search
CPC ............ B60C 11/13; B60C 2011/0381; B60C 11/0311; B60C 11/04; B60C 11/032

USPC ............ 152/209.12, 209.13, 209.22, 209.27, 152/DIG. 3
See application file for complete search history.

(56) References Cited

U.S. PATENT DOCUMENTS 4,078,596 A * 3/1978 Nakayama et al. ............ 152/900
4,884,606 A * 12/1989 Matsuda et al. ......... 152/DIG. 3
(Continued)

FOREIGN PATENT DOCUMENTS

JP  1-153304 A  6/1989
JP  05-032105 A * 2/1993
(Continued)

OTHER PUBLICATIONS

Machine translation for Japan 2004-306872 (no date).*
(Continued)

*Primary Examiner* — Steven D Maki
(74) *Attorney, Agent, or Firm* — Sughrue Mion, PLLC (57) ABSTRACT

A pneumatic tire has a tread pattern designed to provide improved heat dissipation properties, wear resistance, and uneven wear resistance. The tire has arranged in a tread (2) two circumferential fine grooves (10) disposed on opposite sides of the equatorial surface (CL) of the tire and extending in the circumferential direction of the tire, and the circumferential fine grooves (10) define a center land section (11). In the center land section (11) are formed oblique fine grooves (12) each having a first small groove (13) extending in the tire's circumferential direction, a second small groove (14) extending obliquely relative to the circumferential direction from one end of the first small groove (13) toward one circumferential fine groove, and a third small groove (15) extending obliquely relative to the circumferential direction from the other end of the first small groove (13) toward the other circumferential fine groove.

14 Claims, 4 Drawing Sheets (51) Int. Cl.
*B60C 11/13* (2006.01)
*B60C 11/03* (2006.01)

(52) U.S. Cl.
CPC .............. *B60C 11/13* (2013.01); *B60C 11/032* (2013.04); *B60C 11/04* (2013.01); *B60C 2011/0381* (2013.04); *B60C 2200/06* (2013.04); *B60C 2200/065* (2013.04)

(56) References Cited

U.S. PATENT DOCUMENTS

| | | | | |
|---|---|---|---|---|
| 5,524,686 | A | * | 6/1996 | Takada et al. ............ 152/209.27 |
| 6,264,453 | B1 | * | 7/2001 | Jacobs et al. ............. 152/DIG. 3 |
| 2004/0211502 | A1 | * | 10/2004 | Ono ........................ 152/209.27 |
| 2007/0199633 | A1 | * | 8/2007 | Hayashi ................... 152/209.18 |
| 2008/0099115 | A1 | * | 5/2008 | Ohara ...................... 152/209.19 |

FOREIGN PATENT DOCUMENTS

| | | | | |
|---|---|---|---|---|
| JP | 6-171315 | A | | 6/1994 |
| JP | 8-276709 | A | | 10/1996 |
| JP | 09-058222 | A | * | 3/1997 |
| JP | 11-034615 | A | * | 2/1999 |
| JP | 11-048720 | A | * | 2/1999 |
| JP | 2004-098914 | A | * | 4/2004 |
| JP | 2004-262295 | A | | 9/2004 |
| JP | 2004-262295 | A | * | 9/2004 |
| JP | 2004-306872 | A | * | 11/2004 |
| JP | 2008-13037 | A | | 1/2008 |
| WO | 97/46400 | A1 | | 12/1997 |

OTHER PUBLICATIONS

Machine translation for Japan 11-048720 (no date).*
Machine translation for Japan 09-058222 (no date).*
Machine translation for Japan 2004-262295 (no date).*
Machine translation for Japan 2004-098914 (no date).*
Machine translation for Japan 11-034615 (no date).*
International Search Report dated Apr. 21, 2009 (2 pages).
Chinese Office Action issued in Chinese Application No. 200980114913.3 dated Dec. 3, 2012.
Japanese Office Action dated Jan. 22, 2013, issued in Japanese Patent Application No. 2008-307452.
Chinese Office Action, dated May 6, 2013, issued in corresponding Chinese Patent Application No. 200980114913.3.
European Office Action issued Sep. 25, 2014 in European Patent Application No. 09 714 395.2.
Extended European Search Report issued Jan. 27, 2015 in European Patent Application No. 09714395.2.

* cited by examiner

FIG. 6

HEAVY DUTY TIRE

TECHNICAL FIELD

The present invention relates to a pneumatic tire having, on a tread portion, two circumferential narrow grooves extending in a tire circumferential direction and arranged on both sides of a tire equator plane, and a central land portion defined by the circumferential narrow grooves, and, in particular, to a pneumatic tire for heavy load, and secures sufficient heat radiation of the pneumatic tire while improving wear resistance and partial wear resistance of the pneumatic tire.

BACKGROUND ART

For a pneumatic tire for heavy load for use in a construction vehicle, a significantly high load-bearing ability and a traction performance are required as compared with a pneumatic tire for heavy load such as a tire for use in a truck, bus or light-weight truck. For this reason, conventionally, a so-called rib-lug pattern has been generally employed for a tire tread pattern in which a rib-shaped land portion continuously extending in a tire circumferential direction is arranged in a central region from the viewpoint of wear resistance, and plural lug grooves are arranged in respective side regions from the viewpoint of ensuring traction. However, when the width of the rib-shaped land portion arranged in the central region is too great, the fraction for climbing a hill deteriorates, and a side slippage likely occurs at the time of steering because of absence of the groove extending in the circumferential direction in the central region. Also, sufficient traction cannot be obtained because of absence of a transverse groove in the central region.

In view of the fact as described above, Patent Document 1 discloses a tire in which circumferential narrow grooves defining a central land portion are arranged in a central region to suppress a side slippage at the time of steering, and a transverse narrow groove is arranged on a central land portion to sufficiently improve the traction. In general, when the transverse groove is provided on the central land portion, rigidity at the central land portion decreases, and the wear resistance at the central land portion decreases, accordingly. However, because the groove traversing the central land portion is a narrow groove, the central land portion deforms in the tire circumferential direction due to a friction force between the central land portion and a road surface at the time when the tire rotates under load, and the transverse narrow groove closes in a road contacting region thereof, which causes the adjacent central land portions to be substantially connected with each other. This suppresses the decrease in the rigidity of the central land portion, and also suppresses the decrease in the wear resistance in the central region. Further, outside of the road contacting region, the transverse groove that traverses remains opened, whereby the heat radiation performance of the central land portion effectively improves.

Patent Document 1: JP 2004-262295A

DISCLOSURE OF THE INVENTION

Problems to be Solved by the Invention

Although the pneumatic tire described in Patent Literature 1 sufficiently secures the heat radiation at the central land portion while suppressing the decrease in the wear resistance, further improvement in the wear resistance and further improvement in the partial wear resistance are being demanded.

In view of the fact described above, an object of the present invention is to provide a pneumatic tire having improved wear resistance and partial wear resistance while sufficiently securing heat radiation by optimizing a tread pattern.

Means for Solving the Problems

To achieve the object above, a pneumatic tire according to the present invention has, on a tread portion, two circumferential narrow grooves extending in a tire circumferential direction and arranged on both sides with respect to a tire equator plane, and a central land portion defined by the circumferential narrow grooves, the pneumatic tire which includes: an inclined narrow groove provided, on the central land portion, with a first small groove extending along the tire circumferential direction, a second small groove extending from one end portion of the first small groove toward one of the circumferential narrow grooves so as to incline with respect to the tire circumferential direction, and a third small groove extending from the other end of the first small groove toward the other one of the circumferential narrow grooves so as to incline with respect to the tire circumferential direction. According to the tire of the present invention, the inclined narrow groove is provided on the central land portion to sufficiently release heat generated in a belt layer from the inclined narrow groove, whereby breakage of the belt layer caused by accumulation of heat is suppressed. Further, even if the second small groove and the third small groove wear in a heel and toe manner, the second small groove and the third small groove are separated by the first small groove in a tire circumferential direction, and the worn regions are also separated in the tire circumferential direction. Therefore, steps caused by a difference in a degree of wear are finely dispersed in the circumferential direction; vibration at the time of tire rotation under load is made small; partial wear caused by the vibration is suppressed, whereby the partial wear resistance can be improved. Yet further, since the second small groove and the third small groove are inclined with respect to the tire circumferential direction, the road contacting regions of the tire fall and deform in the tire circumferential direction due to friction with the road surface at the time of tire rotation under load. Therefore, the groove width of each of the second small groove and the third small groove becomes small, and a difference between a road contacting length on a tire equator plane side and that on a tread end side becomes small. Consequently, a difference between wear on the tire equator plane side and that on the tread end side at the time of tire rotation under load becomes small, whereby the partial wear resistance can be improved. Yet further, since the size of the groove width of each of the circumferential narrow groove and the inclined narrow groove is small, negative ratio is small, whereby it is possible to sufficiently secure rigidity at the land portions and improve the wear resistance. The "circumferential narrow groove extending in tire circumferential direction" as used in this specification includes not only a narrow groove linearly extending along the tire circumferential direction but also a narrow groove extending in a zigzag manner or a wave manner, and encircling in the circumferential direction over the tire.

Further, it is preferable that each of the circumferential narrow grooves be arranged so as to be spaced away from the tire equator plane on an outer side in a tire widthwise direction by a distance of 25-60% of a tread width, and more preferably, by a distance of 45-60% of the tread width.

Further, it is preferable that a groove width of each of the circumferential narrow grooves fall in 2.5-15.0 mm, and more preferably, in 2.5-7.0 mm.

Yet further, it is preferable that angles each formed by the second small groove and the third small groove with respect to the tire circumferential direction fall within 30-60°, and more preferably, within 30-45°. Note that the "angles formed . . . with respect to the tire circumferential direction" as used in this specification refers to an angle measured from an acute angle side among crossing angles formed by the second small groove and the third small groove with respect to the tire circumferential direction.

Further, it is preferable that groove widths of the first small groove, the second small groove and the third small groove fall within 2.5-7.0 mm, and more preferably, within 2.5-5.0 mm.

Yet further, it is preferable that the first small groove be arranged on a circumference at equal pitches, and a distance of the first small groove in the tire circumference direction fall within 15-25% of a pitch length, and more preferably, within 20-25% thereof.

Further, it is preferable that a depth of the circumferential narrow groove fall within 75-100% of a distance of a tread rubber of the tread portion in a tire radial direction, and more preferably, within 75-85% thereof.

Further, it is preferable that a depth of the inclined narrow groove fall within 60-100% of a distance of a tread rubber of the tread portion in a tire radial direction, and more preferably, within 75-85% thereof.

Yet further, it is preferable that the second small groove and the third small groove extend from respective end portions of the first small groove toward the respective circumferential narrow grooves, and terminate within the central land portion, and the inclined narrow groove be arranged between the tire equator plane and a position 12.5% away from the tire equator plane on the outer side in a tire widthwise direction.

At this time, it is preferable that an end portion on a terminating side of each of the second small groove and the third small groove be formed in a cylindrical shape having a diameter 3-5 times larger than groove widths of the second small groove and the third small groove.

Alternatively, it is preferable that the second small groove and the third small groove extend from respective end portions of the first small groove and communicate with the respective circumferential narrow grooves, and angles each formed by the second small groove and the third small groove with respect to the respective circumferential narrow grooves fall within 30-60° at respective positions at which the second small groove and the third small groove communicate with the respective circumferential narrow grooves, and more preferably, within 30-45°. Note that the "angles each formed by the second small groove and the third small groove with respect to the respective circumferential narrow grooves" as used in this specification refers to an angle measured from an acute angle side among crossing angles formed by the second small groove and the third small groove with respect to the respective circumferential narrow grooves.

Further, it is preferable that each of the second small groove and the third small groove have an inflection point at which each inclined angle formed by the second small groove and the third small groove with respect to the tire circumferential direction changes, and which is located away from the tire equator plane on the outer side in the tire widthwise direction by a distance of 12.5-25.0% of a tread width. Note that the expression "angle . . . changes" as used herein not only includes a case where the inclined angle formed by the second small groove and the third small groove with respect to the tire circumferential direction immediately changes at a predetermined position, but also includes a case where the inclined angle gradually changes in a predetermined section.

Note that the expression "inflection point" as used herein refers to a point where an inclined angle formed by the inclined narrow groove extending from the tire equator plane side is inflected, and more specifically, a point where, assuming a Cartesian coordinate in which a vertical axis represents a tire circumferential direction and a horizontal axis represents a tire widthwise direction, the inclined angle is changed into a fourth quadrant in a case where an acute angle among angles formed by the inclined narrow groove and the tire circumferential direction falls in a first quadrant, and, the inclined angle is changed into the third quadrant in a case where the acute angle falls in a second quadrant.

Further, it is preferable that the number of the inclined narrow groove to be arranged on the circumference fall within 32-40, and more preferably, within 36-38.

Yet further, it is preferable that a width of an end portion on a road facing side of the inclined narrow groove be greater than a groove width at other portions of the inclined narrow groove.

At this time, it is preferable that the end portion on the road facing side of the inclined narrow groove have a raised bottom portion formed in a stepped shape, as sectionally viewed in the tire widthwise direction.

Further, it is preferable that a width of the raised bottom portion fall within 70-130% of a groove width at other portions of the inclined narrow groove.

Further, it is preferable that a depth of the raised bottom portion fall within 70-130% of a groove width of the inclined narrow groove.

Yet further, it is preferable that a width of the raised bottom portion fall within 3.0-6.0 mm.

Further, it is preferable that a depth of the raised bottom portion fall within 3.0-6.0 mm.

Effects of the Invention

According to the present invention, it is possible to provide a pneumatic tire having improved wear resistance and partial wear resistance while sufficiently securing heat radiation, by optimizing a tread pattern.

REFERENCE SYMBOLS

1 Tire
2 Tread portion
3 Side wall portion
4 Bead portion

5 Bead core
6 Carcass layer
7 Belt layer
8 Tire cavity
9 Inner liner
10 Circumferential narrow groove
11 Central land portion
12 Inclined narrow groove
13 First small groove
14 Second small groove
15 Third small groove
16 Termination end part
17 Cylindrically shaped groove
18 Inflection point
19 End portion on a road facing side of inclined narrow groove
20 Raised bottom portion
R Rim
CL Tire equator plane
D1 Tread width
D2 Distance of first small groove in tire circumferential direction
D3 Pitch length
D4 Depth of raised bottom portion
W1 Width of end portion on road facing side of inclined narrow groove
W2 Groove width of inclined narrow groove
W3 Width of raised bottom portion
θ1 Angle formed by second small groove and third small groove with respect to tire circumferential direction
θ2 Angle formed by second small groove and third small groove with respect to circumferential narrow groove of tire at communicating position

BEST MODE FOR CARRYING OUT THE INVENTION

Figure 1:
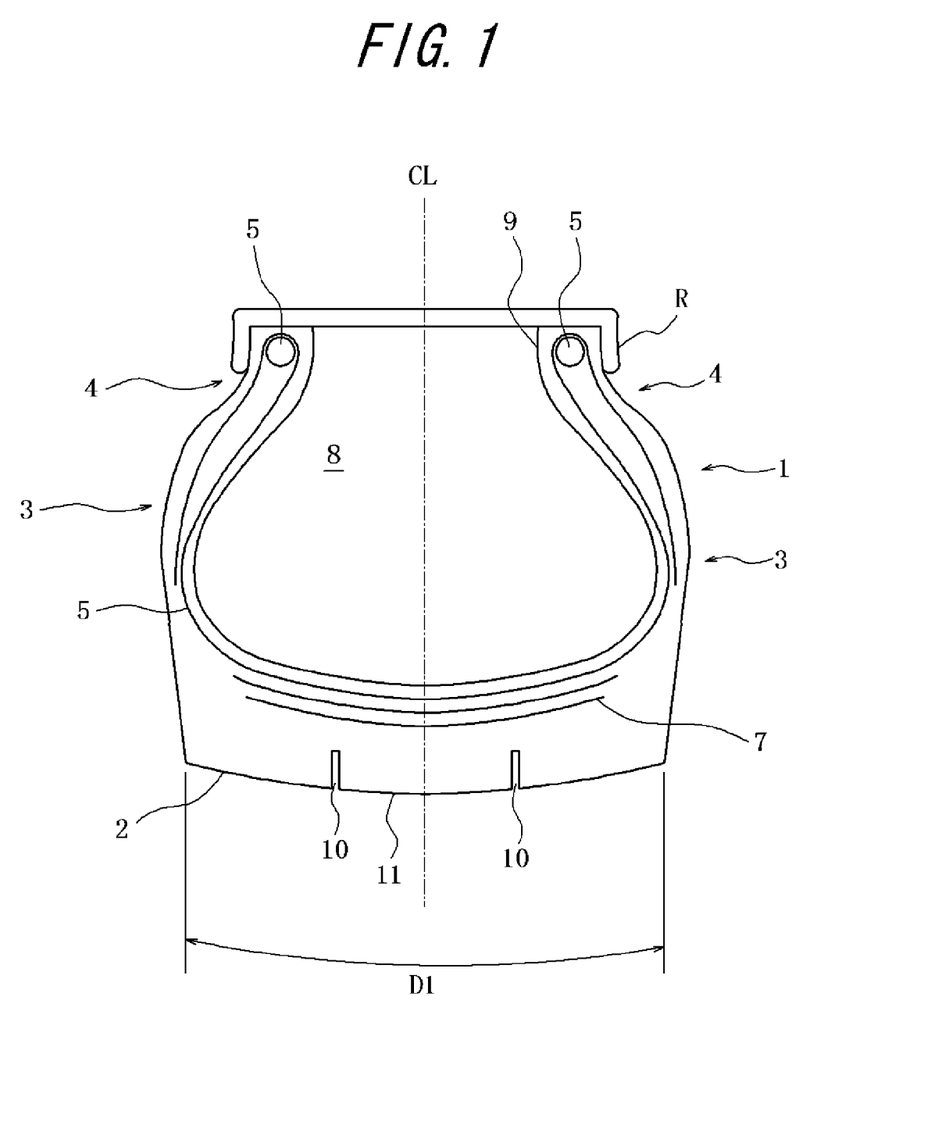
FIG. 1 is a tire-widthwise-direction sectional view of an assembly of a rim and a typical pneumatic tire according to the present invention.
Figure 2:
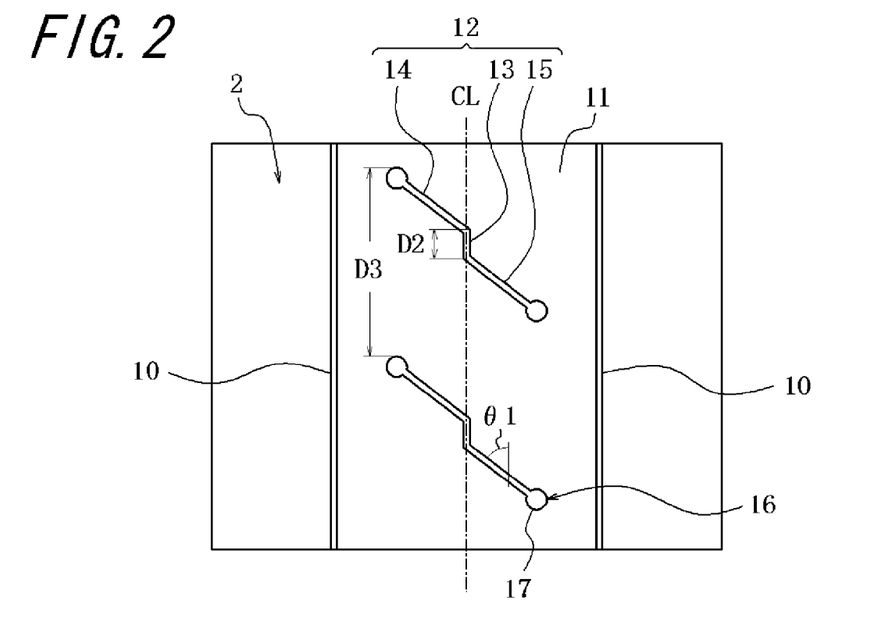
FIG. 2 is a development of part of a tread portion of the tire shown in FIG. 1.
Figure 3:
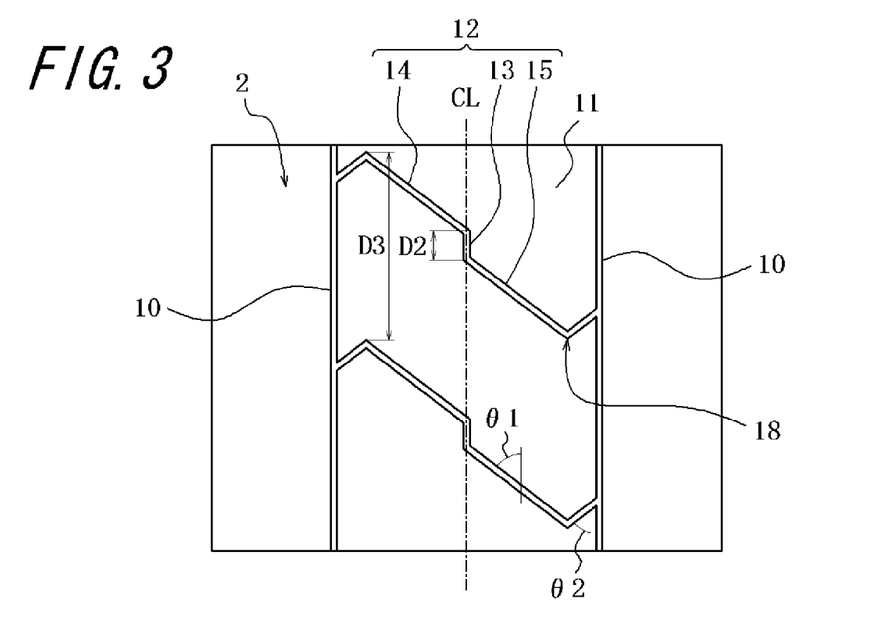
FIG. 3 is a development of part of a tread portion of another tire according to the present invention.
Figure 4:
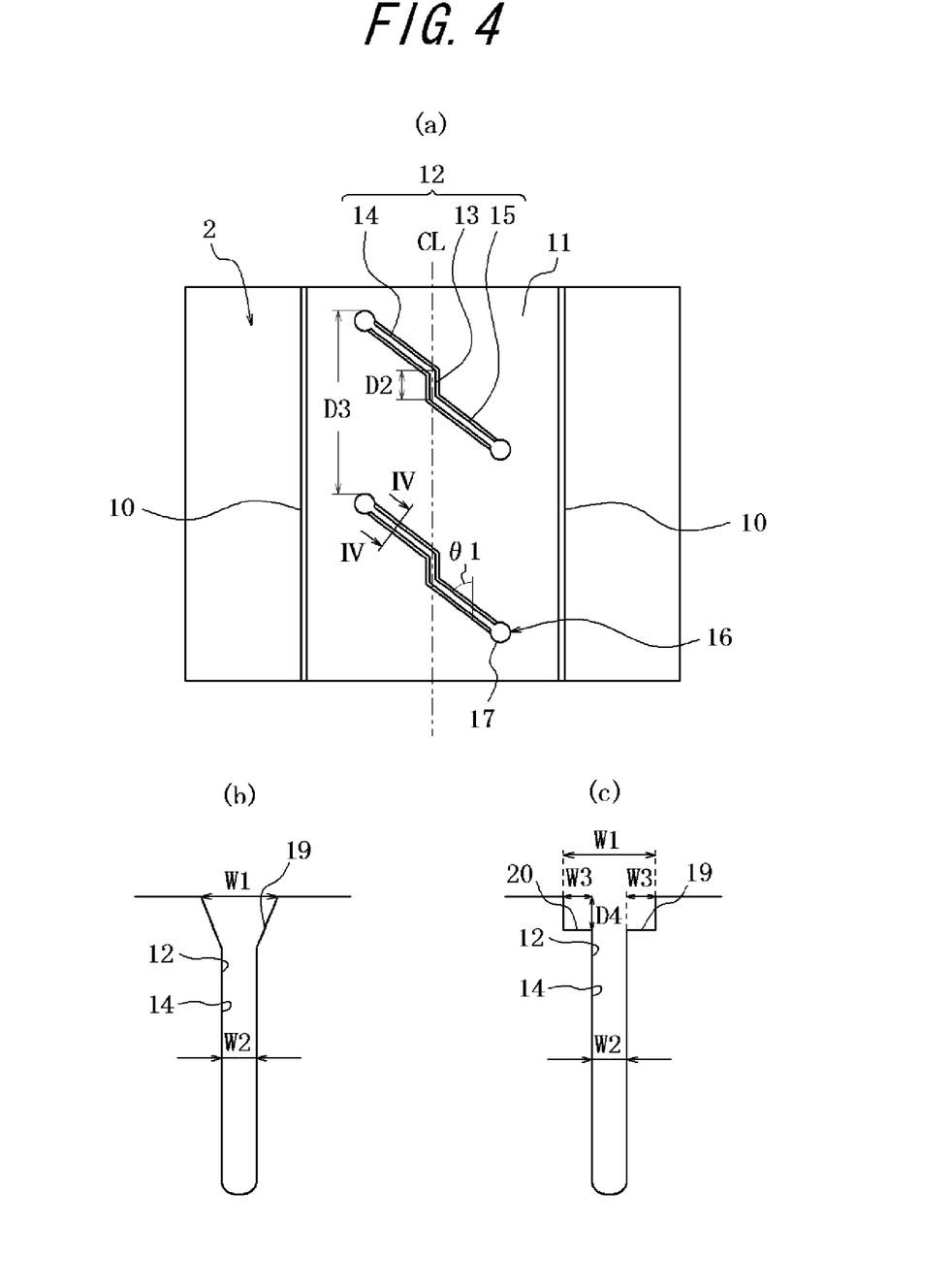
FIG. 4A is a development of part of a tread portion of another tire according to the present invention.
FIG. 4B is a sectional view taken along IV-IV line of the tread portion shown in FIG. 4A.
FIG. 4C is a sectional view of an inclined narrow groove of the other tire according to the present invention.

Hereinbelow, embodiments of the present invention will be described with reference to the drawings. FIG. 1 is a tire-widthwise-direction sectional view of a tire-rim assembly in which a typical pneumatic tire (hereinafter, referred to as "tire") according to the present invention is mounted on a rim. FIG. 2 is a development of part of a tread portion of the tire shown in FIG. 1, and FIG. 3 is a development of part of a tread portion of another tire according to the present invention. FIG. 4A is a development of part of a tread portion of another tire according to the present invention; FIG. 4B is a sectional view taken along IV-IV line of the tread portion shown in FIG. 4A; and FIG. 4C is a sectional view of an inclined narrow groove of the other tire according to the present invention.

The tire 1 according to the present invention is constituted, in accordance with a conventional practice, of: a tread portion 2 brought into contact with a road surface; a pair of side wall portions 3 extending from both sides of the tread portion 2 on an inner side in a radial direction of the tire; and, a pair of bead portions 4 provided on the inner side in the radial direction of the tire than the respective side walls 3 and fitted into a rim R. Within the tire 1, there are provided a carcass layer 6 that toroidally extends between bead cores 5, 5 buried in the respective bead portions 4 and forms a framework structure of the tire 1, and a belt layer 7 located on an outer periphery side of a crown region of the carcass layer 6 and reinforcing the tread portion 2. Further, an inner liner 9 impermeable to air is disposed on an inner surface side of the tire 1, that is, on a side that faces a tire cavity 8 defined by the tire 1 and the rim R. Yet further, as shown in FIG. 2, the tire 1 according to the present invention is configured such that, at the tread portion 2, two circumferential narrow grooves 10, 10 linearly extending in a circumferential direction of the tire are arranged on both sides of the tire equator plane, and a central land portion 11 is defined by the circumferential narrow grooves 10, 10. A z-shaped inclined narrow groove 12 is disposed at the central land portion 11; the inclined narrow groove 12 is constituted of a first small groove 13 extending along the circumferential direction of the tire; a second small groove 14 extending from one end of the first small groove 13 toward one of the circumferential narrow grooves 10 so as to incline with respect to the circumferential direction of the tire; and, a third small groove 15 extending from the other end of the third small groove 13 toward the other one of circumferential narrow grooves 10 so as to incline with respect to the circumferential direction of the tire. In general, the belt layer is a heat generation source that repeatedly deforms due to the tire rotation under load, and generates heat. The generated heat may lead to breakage of the belt layer 7 as a result of excessive accumulation of heat at the belt layer 7. In the tire 1 according to the present invention, the inclined narrow groove 12 is provided on the central land portion 11 to sufficiently release the heat generated at the belt layer 7 from the inclined narrow groove 12, whereby the heat breakage of the belt 7 caused by the heat accumulation can be suppressed. Further, a rubber portion in the vicinity of the second small groove 14 and the third small groove 15, each of which inclines with respect to the circumferential direction of the tire, wears at an earlier stage than other regions due to a heel-and-toe wear, and hence a step caused by a difference in a degree of wear on the circumference appears in the circumferential direction of the tire. This step causes the occurrence of vibration when the tire rotates under load, and the tread portion does not wear evenly because of the vibration, which results in the partial wear of the tread portion. However, in the tire 1 according to the present invention, since the second small groove 14 and the third small groove 15 are spaced apart from each other in the circumferential direction by the first small groove 13, the regions where the heel-and-toe wear occurs are space apart from each other in the circumferential direction of the tire. Therefore, the step caused by the wear difference is more finely dispersed on the circumference, as compared with a case where the regions are not separated from each other in the circumferential direction of the tire. As a result, the vibration caused by the wear difference when the tire rotates under load becomes small, and the partial wear caused by the vibration is suppressed, whereby the partial wear resistance of the tire can be improved. Further, in general, since a road contacting length in a road contacting region on the tread end side is smaller than that on the tire equator plane side, a surface contacting pressure on the tire equator plane is greater than that on the tread end side. Therefore, wear on the tire equator plane side occurs earlier than that on the tread end side, and hence, a wear difference occurs between the inner side and the outer side in the tire widthwise direction, which results in the partial wear of the tire. However, in the tire 1 according to the present invention, the second small groove 14 and the third small groove 15 incline with respect to the circumferential direction of the tire, falls and deform in the circumferential direction of the tire due to the friction of the road contacting region at the time of tire rotation under load; and, groove widths of the second small groove 14 and the third small groove 15 on the central land portion 11 in the road contacting region becomes small when the tire rotates under load, and the road contacting length on the central land portion 11 becomes small, whereby a difference between the road contacting length on the tire equator plane side and that on the tread end side becomes small. As a result, a road contacting shape of the tread portion with respect to the road surface becomes substantially rectangular, and a difference between the road contacting pressure on the tire equator plane side and that on the tread end side becomes small, whereby a wear difference between the tire equator plane side and the tread end side at the time of tire rotation under load becomes small, and it is possible to improve the partial wear resistance. Yet further, since the circumferential narrow groove 10 and the inclined narrow groove 12 are formed by narrow grooves having a small groove width, a negative ratio can be made small, whereby it is possible to sufficiently secure rigidity of the land portion, and to improve the partial wear resistance.

Further, it is preferable that the circumferential narrow groove 10 be spaced apart from the tire equator plane CL toward an outer side in a widthwise direction of the tire, by a distance of 25-60% of a tread width D1, and more preferably, by a distance of 45-60% of a tread width D1. This is because, in a case where the circumferential narrow groove 10 is arranged at a distance of less than 25% of the tread width from the tire equator plane CL on the outer side in the widthwise direction of the tire, a length of the central land portion 11 including the tire equator plane in the widthwise direction of the tire is too small, and the central land portion 11 lacks the rigidity, possibly leading to reduction in the wear resistance and the partial wear resistance of the central land portion 11. On the other hand, in a case where the circumferential narrow groove 10 is arranged at a distance of more than 60% of the tread width from the tire equator plane CL on the outer side in the widthwise direction of the tire, a length of a shoulder land portion 11 in the widthwise direction of the tire, which is a land portion of the central land portion 11 on the outer side in the widthwise direction of the tire, is too small, and the shoulder land portion lacks the rigidity, possibly leading to reduction in the partial wear resistance of the shoulder land portion.

Further, it is preferable that a groove width of the circumferential narrow groove 10 fall within 2.5-15.0 mm, and more preferably, fall within 2.5-7.0 mm. This is because, in a case where the groove width of the circumferential narrow groove 10 is less than 2.5 mm, even if a depth of the circumferential narrow groove 10 is sufficient, an area of a groove bottom capable of releasing heat is not sufficient when the belt layer 7 on the groove bottom side is heated. Hence, the heat cannot be effectively released from the circumferential narrow groove 10, and is excessively accumulated at the belt layer 7, possibly leading to the heat breakage of the belt layer 7. On the other hand, in a case where the groove width of the circumferential narrow groove 10 exceeds 15.0 mm, the negative ratio at the tread portion 2 is too great, and the rigidity of the tread portion 2 decreases, possibly leading to reduction in the wear resistance.

Yet further, it is preferable that an angle θ1 at which the second small groove 14 and the third small groove 15 incline with respect to the tire circumferential direction fall within 30-60°, and more preferably, fall within 30-45°. This is because, in a case where the angle θ1 at which the second small groove 14 and the third small groove 15 incline with respect to the tire circumferential direction is set at 30° or more, when the second small groove 14 and the third small groove 15, each of which is to be contacted with the road surface, are brought into contact with each other, each opening portion thereof is closed in the tire circumferential direction even if the road contacting region of the tread is pulled and deformed in the tire circumferential direction by the friction with the road surface at the time of tire rotation under load, whereby it is possible to improve rigidity in the road-surface contact region of the tread portion 2 and further improve the wear resistance. On the other hand, in a case where the angle θ1 at which the second small groove 14 and the third small groove 15 incline with respect to the tire circumferential direction exceeds 60°, the rubber of the tread portion 2 largely deforms at the time of step-in or kick-out when the tire rotates under load, and the partial wear occurs due to the heel-and-toe wear, which leads to the decrease in the partial wear resistance.

Further, it is preferable that groove widths of the first small groove 13, the second small groove 14, and the third small groove 15 fall within 2.5-7.0 mm, and more preferably, fall within 2.5-5.0 mm. This is because, in a case where the groove widths of the first small groove 13, the second small groove 14, and the third small groove 15 are less than 2.5 mm, the rigidity at the central land portion 11 can be sufficiently secured and the wear resistance can be effectively improved, but an area on the groove bottom side of the inclined narrow groove 12 is not sufficient, and the heat cannot be sufficiently released, and is excessively accumulated at the belt layer 7 of the central land portion 11, possibly leading to the heat breakage of the belt layer 7. On the other hand, in a case where the groove widths of the first small groove 13, the second small groove 14, and the third small groove 15 exceed 7.0 mm, the area on the groove bottom side of the inclined narrow groove 12 can be sufficiently secured, and the heat radiation can be effectively improved. Therefore, the heat is not excessively accumulated in the vicinity of the belt layer 7 of the central land portion 11, whereby the heat breakage at the belt layer 7 can be prevented. However, the negative ratio at the central land portion 11 is too great, and the rigidity at the central land portion 11 is too decreased, possibly leading to reduction in the wear resistance.

Yet further, the first small groove 13 is arranged on the circumference at equal pitches, and it is preferable that the distance D2 between adjacent first small grooves 13 in the tire circumferential direction fall within 15-25% of a pitch length D3, and more preferably, fall within 20-25% of the pitch length D3. This is because, when the distance D2 of the first small groove 13 in the tire circumferential direction falls within 15-25% of the pitch length D3, the second small groove 14 and the third small groove 15, rubber region located in the vicinity of which is likely to wear, are sufficiently spaces apart from each other in the tire circumferential direction, whereby it is possible to disperse the step in the tire circumferential direction caused by the heel-and-toe wear, and suppress the partial wear as described above. Note that, in a case where the distance D2 of the first small groove 13 in the tire circumferential direction is less than 15% of the pitch length D3, the distance of the first small groove 13 in the tire circumferential direction is too small, and the second small groove 14 and the third small groove 15 are too close to each other in the circumferential direction, whereby the step caused by the heel-and-toe wear cannot be sufficiently dispersed in the tire circumferential direction, possibly leading to reduction in the partial wear resistance. On the other hand, in a case where the distance D2 of the first small groove 13 in the tire circumferential direction exceeds 25% of the pitch length D3, the central land portion 11 is partitioned in the tire circumferential direction, whereby the rigidity of the central land portion 11 decreases, possibly leading to reduction in the wear resistance.

Further, a depth of the circumferential narrow groove 10 falls within 75-100% of a distance of a tread rubber of the tread portion 2 in the tire radial direction, and more preferably, falls within 75-85% of the distance thereof. This is because, in a case where the depth of the circumferential narrow groove 10 is less than 75% of the distance of the tread rubber in the tire radial direction, the depth of the circumferential narrow groove 10 is not sufficient, the heat generated at the belt layer 7 is accumulated in a rubber layer on the groove bottom side of the circumferential narrow groove 10, whereby sufficient heat radiation cannot be secured, possibly leading to the breakage of the belt layer 7 caused by the excess heat accumulation. On the other hand, in a case where a tire in which the depth of the circumferential narrow groove 10 exceeds 100% of the distance of the tread rubber in the tire radial direction is manufactured, the belt layer 7 and the carcass layer 6 are pressed on the inner side in the radial direction of the tire by a blade for forming the circumferential narrow groove 10 at the time of vulcanization molding, and are formed into an uneven shape, whereby variation in rigidity occurs at the tread portion 2, possibly leading to reduction in the partial wear resistance.

Further, it is preferable that a depth of the inclined narrow groove 12 be 60-100% of a distance of the tread rubber of the tread portion 2 in the tire circumferential direction, and more preferably, be 75-85% of the distance thereof. This is because, in a case where the depth of the inclined narrow groove 12 is less than 60% of the distance of the tread rubber in the tire radial direction, the depth of the inclined narrow groove 12 is not sufficient, the heat generated at the belt layer 7 is accumulated in a rubber layer on a groove bottom side of the inclined narrow groove 12, whereby sufficient heat radiation cannot be secured, possibly leading to the breakage of the belt layer 7 caused by the excess heat accumulation. On the other hand, in a case where a tire in which the depth of the inclined narrow groove 12 exceeds 100% of the distance of the tread rubber in the tire radial direction is manufactured, the belt layer 7 and the carcass layer 6 are pressed on the inner side in the radial direction of the tire by a blade for forming inclined narrow groove 12 at the time of vulcanization molding, and are formed into an uneven shape. This causes the belt layer 7 to repeatedly deform into a wave shape in the tire circumferential direction at the time or tire rotation under load, possibly leading to reduction in the durability and the partial wear resistance of the tire.

Yet further, it is preferable that the second small groove 14 and the third small groove 15 extend from respective end portions of the first small groove 13 toward the respective circumferential narrow grooves 10, and each terminate within the central land portion 11. This is because, in a case where the second small groove 14 and the third small groove 15 terminate within the central land portion 11, the rigidity of the central land portion 11 can be increased, as compared with a case where the second small groove 14 and the third small groove 15 extend so as to communicate with the respective circumferential narrow grooves 10, whereby the wear resistance can be improved. At this time, it is preferable that the inclined narrow groove 12 be arranged between the tire equator plane CL and a position spaced apart by 12.5% from the tire equator plane CL on the outer side in the widthwise direction of the tire. This is because, in a case where the inclined narrow groove 11 further extends beyond the range described above, the rigidity of the central land portion 11 too decreases, possibly leading to reduction in the wear resistance.

Further, when the second small groove 14 and the third small groove 15 terminate within the central land portion 11, it is preferable that an end portion 16 (hereinafter, referred to as "termination end part") on a terminating side of each of the second small groove 14 and the third small groove 15 be formed in a cylindrical shape 17 having a diameter 3-5 times larger than the groove width of the second small groove 14 and the third small groove 15. In a case where the termination end part is not formed in the cylindrical shape having the dimension as described above, a tensile stress is concentrated at the termination end part when the inclined narrow groove is pulled and largely opened in the tire circumferential direction caused by the friction with the road surface at the time of tire rotation under load. This concentration of the tensile stress causes cracks to be generated at the rubber portion of the termination end part, possibly leading to the breakage of the tread portion. For this reason, by providing each of the termination end parts 16 of the second small groove 14 and the third small groove 15 with the cylindrically-shaped groove 17 having a diameter 3-5 times larger than the groove width of the second small groove 14 and the third small groove 15, the tensile stress concentrated at the termination end parts 16 when the inclined narrow groove 12 is opened by the friction with the road surface at the time of tire rotation under load can be effectively dispersed as compared with a case where the termination end part 16 is not formed in the circular groove 17 having the dimension as described above, whereby it is possible to suppress the generation of the crack at the rubber portion and prevent the breakage of the tread portion 2. At this time, in a case where the diameter of the termination end part 16 formed in the cylindrical shape 17 is smaller than three times the groove width of each of the second small groove 14 and the third small groove 15, the region for dispersing the tensile stress cannot be sufficiently secured, whereby the generation of the crack at the rubber portion cannot be suppressed, possibly leading to the breakage of the tread portion 2. On the other hand, in a case where the diameter of the terminal end part 16 formed in the cylindrical shape 17 exceeds five times the groove width of each of the second small groove 14 and the third small groove 15, the tensile stress can be sufficiently dispersed. However, the negative ratio at the central land portion 11 decreases, whereby the sufficient rigidity at the land portion cannot be secured, possibly leading to reduction in the wear resistance.

Alternatively, as shown in FIG. 3, it is preferable that the second small groove 14 and the third small groove 15 extend from the respective end portions of the first small groove 13 and communicate with the respective circumferential narrow grooves 10. This is because, in a case where the second small groove 14 and the third small groove 15 extend and communicate with the respective circumferential narrow grooves 10, a groove area of the inclined narrow groove 12 is made larger as compared with a case where the second small groove 14 and the third small groove 15 terminate within the central land portion 11, whereby it is possible to improve the heat radiation at the central land portion 11. At this time, at a position where each of the second small groove 14 and the third small groove 15 is communicated with the circumferential narrow grooves 10, it is preferable that an angle θ2 formed by each of the second small groove 14 and the third small groove 15 with respect to the circumferential narrow groove 10 fall within 30-60°, more preferably, within 30-45°. In a case where the angle θ2 formed by each of the second small groove 14 and the third small groove 15 with respect to the circumferential narrow groove 10 is less than 30°, sharp portions are formed at a portion sandwiched between the second small groove 14 and the circumferential narrow groove 10 and a portion sandwiched between the third small groove 15 and the circumferential narrow groove 10, whereby the rigidity thereof is reduced. As a result, said portions fall down at the time of contacting with the road surface, and escape from contact with the road surface, and only the sandwiched portions partially wear in a slow manner, which poses a problem of the partial wear. However, by setting the angle θ2 formed by each of the second small groove 14 and the third small groove 15 with respect to the circumferential narrow groove 10 at 30° or more at the position where each of the second small groove 14 and the third small groove 15 is communicated with the circumferential narrow groove 10, the sharp portions are not formed at the portion sandwiched between the second small groove 14 and the circumferential narrow groove 10 and the portion sandwiched between the third small groove 15 and the circumferential narrow groove 10, whereby the rigidity of said portions can be increased. Therefore, said portions do not fall down at the time of contacting with the road surface and reliably contact the road surface, and the road contacting pressure is kept at a uniform manner, whereby the partial wear resistance can be improved. Further, when the angle θ2 formed by each of the second small groove 14 and the third small groove 15 with respect to the circumferential narrow groove 10 exceeds 60° at the position where each of the second small groove 14 and the third small groove 15 is communicated with the circumferential narrow groove 10, the rubber at the tread portion 2 largely deforms at the time of step-in or kick-out when the tire rotates under load, and the partial wear occurs due to the heel-and-toe wear, whereby the partial wear resistance is reduced.

Further, it is preferable that each of the second small groove 14 and the third small groove 15 have an inflection point 18 at which an angle inclined with respect to the tire circumferential direction changes, and which is located away from the tire equator plane CL on the outer side in the tire widthwise direction by a distance of 12.5-25.0% of the tread width D1. This is because, by employing the configuration above, respective groove walls forming the second small groove 14 and the third small groove 15 deform with respect to the road surface so as to close openings thereof at the time of tire rotation under load to sufficiently secure the rigidity of the central land portion 11; and at the same time, with this inflection point 18, the second small groove 14 and the third small groove 15 are extremely sharply angled in the tire circumferential direction at respective positions where the second small groove 14 and the third small groove 15 communicate with the circumferential narrow groove 11, whereby the occurrence of the partial wear at the portion connecting with the circumferential narrow groove 11 can be further suppressed, without forming the angled portion, which serves as the core of the partial wear.

Yet further, it is preferable that the number of the inclined narrow groove 12 to be arranged on the circumference fall within 32-40, and more preferably, fall within 36-38. This is because, by setting the number of the inclined narrow groove 12 at 32-40 on the circumference, the rigidity of the central land portion 11 is decreased in a well-balanced manner to reduce the region where the rigidity of the land portion is partially high, whereby it is possible to suppress the partial wear caused by the difference in the rigidity on the circumference.

Yet further, as shown in FIG. 4A and FIG. 4B, it is preferable that a width W1 at an end portion 19 of the inclined narrow groove 12 on a road facing side where an opening thereof faces the road surface be wider than a groove width W2 of the other portion of the inclined narrow groove 12. The inventors found that, in a case where the inclined narrow groove 12 as described above is provided to the tread portion 2, and lateral force acts on the land portion in the vicinity of the inclined narrow groove at the time of traveling a corner and the like, the road contacting pressure becomes too high at the edge portion of the land portion in the vicinity of the inclined narrow groove, whereby this edge portion wears at an earlier stage. Also, the present inventors found that, as the angle inclined with respect to the tire circumferential direction of the inclined narrow groove 12 becomes smaller, the lateral force acting on the land portion in the vicinity of the inclined narrow groove becomes larger, and hence, the wear at the earlier stage becomes pronounced not only in a case of the first small groove 13, which extends along the tire circumferential direction, but also in a case where the angle formed by the second small groove 14 and the third small groove 15 with respect to the tire circumferential direction is less than 60°. Therefore, by setting the width W1 at the end portion 19 on the road facing side of the inclined narrow groove 12 at a width wider than the groove width W2 of the other portion of the inclined narrow groove 12, the road contacting pressure at the edge portion of the land portion in the vicinity of the inclined narrow groove does not become too great even when the lateral force acts on the land portion in the vicinity of the inclined narrow groove, whereby it is possible to prevent the edge portion from wearing at the earlier stage. At this time, as shown in FIG. 4C, it may be possible to modify the end portion 19 on the road facing side of the inclined narrow groove 12 into a raised bottom portion 20 having a stepped-shape, as sectionally viewed from the tire width direction.

It is preferable that a width W3 of the raised bottom portion 20 fall within 70-130% of the groove width W2 of the other portion of the inclined narrow groove 12. This is because, in a case where the width W3 of the raised bottom portion 20 exceeds 130% of the groove width W2 of the other portion of the inclined narrow groove 12, the rigidity of the land portion in the vicinity of the inclined narrow groove is excessively decreased, possibly leading to reduction in the wear resistance. On the other hand, in a case where the width W3 of the raised bottom portion 20 is less than 70% of the groove width W2 of the other portion of the inclined narrow groove 12, the road contacting pressure at the edge portion of the land portion in the vicinity of the inclined narrow groove does not become sufficiently small, possibly leading to the situation where the wear at the earlier stage at the edge portion cannot be prevented.

Further, it is preferable that a depth D4 of the raised bottom portion 20 fall within 70-130% of the groove width W2 of the inclined narrow groove 12. This is because, in a case where the depth D4 of the raised bottom portion 20 exceeds 130% of the groove width W2 of the inclined narrow groove 12, the rigidity of the land portion in the vicinity of the inclined narrow groove is excessively decreased, possibly leading to reduction in the wear resistance. On the other hand, in a case where the depth D4 of the raised bottom portion 20 is less than 70% of the groove width W2 of the inclined narrow groove 12, the road contacting pressure at the edge portion of the land portion in the vicinity of the inclined narrow groove does not become sufficiently small, possibly leading to the situation where the wear at the earlier stage at the edge portion cannot be prevented.

Yet further, it is preferable that the width W3 of the raised bottom portion 20 fall within 3.0-6.0 mm. This is because, in a case where the width W3 of the raised bottom portion 20 exceeds 6.0 mm, the rigidity of the land portion in the vicinity of the inclined narrow groove is excessively decreased, possibly leading to reduction in the wear resistance. On the other hand, in a case where the width W3 of the raised bottom portion 20 is less than 3.0 mm, the road contacting pressure at the edge portion of the land portion in the vicinity of the inclined narrow groove does not become sufficiently small, possibly leading to the situation where the wear at the earlier stage at the edge portion cannot be prevented.

In addition, it is preferable that the depth D4 of the raised bottom portion 20 fall within 3.0-6.0 mm. This is because, in a case where the depth D4 of the raised bottom portion 20 exceeds 6.0 mm, the rigidity of the land portion in the vicinity of the inclined narrow groove is excessively decreased, possibly leading to reduction in the wear resistance. On the other hand, in a case where the depth D4 of the raised bottom portion 20 is less than 3.0 mm, the road contacting pressure at the edge portion of the land portion in the vicinity of the inclined narrow groove does not become sufficiently small, possibly leading to the situation where the wear at the earlier stage at the edge portion cannot be prevented.

It should be note that what has been described above exemplifies merely a part of the embodiment of the present invention, and it is possible to combine these configurations with each other or apply various modifications thereto without departing from the spirit of the present invention.

EXAMPLE 1

Next, as a tire for heavy load with size 16.00R25, there were prepared a tire (Conventional Example tire) having conventional lug grooves; a comparative example tire (Comparative Example tire) provided with a central land portion and having, at the central land portion, inclined narrow grooves configured differently from the inclined narrow grooves according to the present invention; and a tire (Example tire 1) provided with a central land portion and having, at the central land portion, inclined narrow grooves according to the present invention, and performance evaluation was made to those prepared tires, which will be described below.

Figure 5:
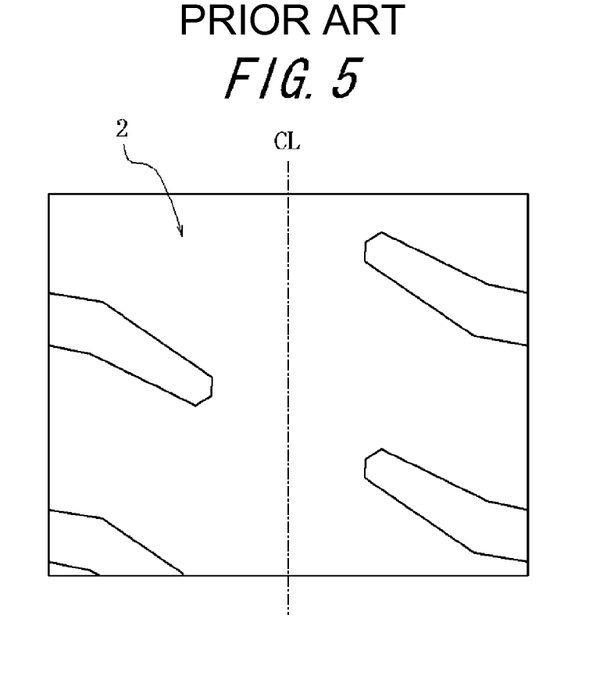
FIG. 5 is a development of part of a tread portion of a conventional example tire; and, FIG. 6 is a development of part of a tread portion of a comparative example tire.
Figure 6:
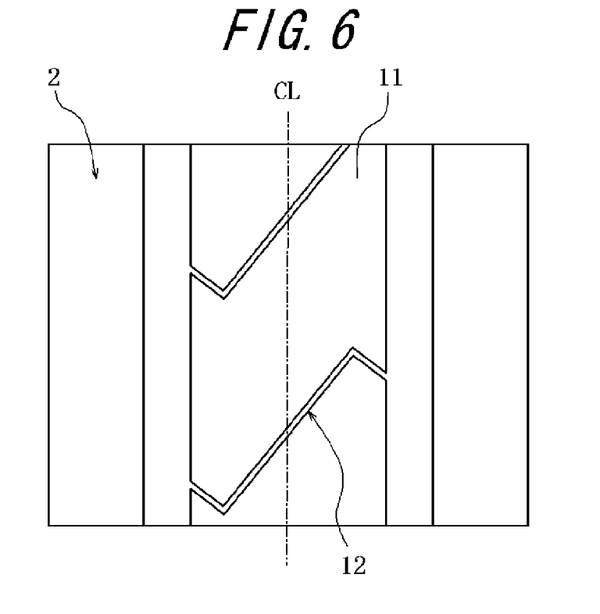

As shown in FIG. 5, Conventional Example tire has, at a tread portion, lug grooves extending from respective tread ends on a tire central equator plane side and terminating without reaching the tire central equator plane, and 36 lug grooves are provided on the circumference, the characteristics of which tire are shown in Table 1. As shown in FIG. 6, Comparative Example tire has two circumferential wide grooves and a central land portion defined by the grooves, and the central land portion is provided with inclined narrow grooves formed only by small grooves inclined with respect to a tire circumferential direction, the characteristics of which tire are shown in Table 1. Further, as shown in FIG. 3, Example tire is provided, at a central land portion defined by circumferential narrow grooves, with inclined narrow grooves including a first small groove extending along a tire circumferential direction, a second small groove extending from one end portion of the first small groove toward one of the circumferential narrow grooves so as to incline at 45° with respect to the tire circumferential direction, and a third small groove extending from the other end of the first small groove toward the other one of the circumferential narrow grooves so as to incline at 45° with respect to the tire circumferential direction. In Example tire 1, the second small groove and the third small groove extend from the respective end portions of the first small groove and communicate with the respective circumferential narrow grooves. Also, the second small groove and the third small groove extend up to the circumferential narrow groove such that an angle inclined with respect to the tire circumferential direction is changed to 135° at a position spaced away from the tire equator plane on the outer side in the tire widthwise direction by a distance of 75% of a tread width. Example tire 1 has the characteristics shown in Table 1.

TABLE 1

|  | Conventional tire | Comparative tire | Example tire 1 |
|---|---|---|---|
| Tread width | 370 mm | 380 mm | 380 mm |
| Width of lug groove | 25 mm | — | — |
| Depth of lug groove | 55 mm | — | — |
| Extending length of lug groove | 140 mm | — | — |
| Width of circumferential wide groove | — | 40 mm | — |
| Depth of circumferential wide groove | — | 50 mm | — |
| Width of circumferential narrow groove | — | — | 5 mm |
| Depth of circumferential narrow groove | — | — | 50 mm |
| Depth of inclined narrow groove | — | — | 40 mm |
| Width of inclined narrow groove | — | — | 4 mm |
| Number of inclined narrow groove on circumference | — | 30 | 36 |

Each of these prepared tires is assembled to a rim with size 11.25/2.0 to obtain tire wheels, is inflated at an air pressure of 1000 kPa (relative pressure), and is subjected to various evaluations.

The wear resistance and the partial wear resistance are evaluated such that each of the prepared tire wheels is attached to a rear wheel serving as a driving wheel of a port container transporting vehicle (so-called "straddle carrier") for use in tests; load is mounted on the vehicle; and, the amount of wear at each part of the tread portion is measured after the vehicle is traveled on a paved road at an average speed of 15 km/h for 1000 hours under tire load of 137 kN (78 kN when no load is mounted). Note that the values of the wear resistance and the partial wear resistance of Comparative Example tire and Example tire 1 are converted and compared relative to those of Conventional Example tire, which is defined as 100. The greater value represents the more improvement in the wear resistance and the partial wear resistance. The evaluation results are shown in Table 2.

Heat radiation is evaluated such that the wheels are rotated at a speed of 15 km/h for 24 hours under tire load at 119 kN on a drum testing unit with a drum diameter of 5000 mm placed in a room at a temperature of 31° C., and temperature of the tire is measured by using a temperature measuring unit. Note that the values of the heat radiation of Comparative Example tire and Example tire 1 are converted and compared relative to those of Conventional Example tire, which is defined as 100. The greater value represents the more improvement in the heat radiation. The evaluation results are shown in Table 2.

TABLE 2

|  | Conventional tire | Comparative tire | Example tire 1 |
|---|---|---|---|
| Wear resistance | 100 | 90 | 110 |
| Partial wear resistance | 100 | 100 | 110 |
| Heat radiation | 100 | 110 | 105 |

As can be clearly appreciated from the results shown in Table 2, although the heat radiation and the partial wear resistance on Comparative Example tire are effectively improved as compared with those on Conventional Example tire, the wear resistance on Comparative Example does not improve sufficiently. On the other hand, all of the wear resistance, the partial wear resistance, and the heat radiation on Example tire 1 are effectively improved as compared with those on Conventional Example tire.

EXAMPLE 2

Next, tires (Example tires 2-5) having the inclined narrow groove according to the present invention are prepared as a tire for heavy load with a tire size 16.00R25, and performance evaluations are made on the prepared tires, which will be described below.

Example tire 2 and Example tires 3-5 are provided with inclined narrow grooves, as shown in FIG. 2 and FIG. 4A, respectively, each constituted of a first small groove provided in a central land portion defined by circumferential narrow grooves and extending along a tire circumferential direction, a second small groove extending from one end portion of the first small groove toward one of the circumferential narrow grooves so as to incline with respect to the tire circumferential direction at 45°, and a third small groove extending from the other end portion of the first small groove to the other one of the circumferential narrow grooves so as to incline with respect to the tire circumferential direction at 45-46°. Further, in Example tires 2-5, the second small groove and the third small groove extend from the respective end portions of the first small groove and communicate with the respective circumferential narrow grooves, and the second small groove and the third small groove extend up to the respective circumferential narrow grooves such that respective angles formed by the second small groove and the third small groove with respect to the tire circumferential direction are changed into 134-135° at a position spaced away by a distance of 75% of a tread width from a tire equator plane on an outer side of the tire widthwise direction. Yet further, in Example tire 2, a width at an end portion on a road facing side of the inclined narrow groove and a groove width of the inclined narrow groove are equal to each other, and on the other hand, in Example tires 3-5, the width at the end portion on a road facing side of the inclined narrow groove is wider than the groove width of other portion of the inclined narrow groove. Each of Example tires 3 and 4 has a raised bottom as shown in FIG. 4C, and Example tire 5 has a configuration shown in FIG. 4B. Note that Example tires 2-5 have characteristics shown in Table 3.

TABLE 3

| | Example tire 2 | Example tire 3 | Example tire 4 | Example tire 5 |
|---|---|---|---|---|
| Tread width | 380 mm | 380 mm | 380 mm | 380 mm |
| Position of circumferential narrow groove | 0.52TW | 0.52TW | 0.52TW | 0.53TW |
| Depth of inclined narrow groove | 40 mm | 40 mm | 40 mm | 40 mm |
| Width of inclined narrow groove | 4 mm | 4 mm | 4 mm | 4 mm |
| Inclined angle of second and third small grooves | 45°/135° | 45°/135° | 45°/135° | 46°/134° |
| Width at end portion on the road facing side of inclined narrow groove | 4 mm | 20 mm | 12 mm | 10 mm |
| Width of raised bottom | — | 8 mm | 4 mm | — |
| Depth of raised bottom | — | 10 mm | 5 mm | — |

Each of these prepared tires is assembled to a rim with size 11.25/2.0 to obtain tire wheels, is inflated at an air pressure of 1000 kPa (relative pressure), and is subjected to various evaluations.

The wear resistance and the partial wear resistance in terms of tire as a whole are evaluated such that each of the prepared tire wheels is attached to a rear wheel serving as a driving wheel of a port container transporting vehicle (so-called "straddle carrier") for use in tests; load is mounted on the vehicle; and, the amount of wear at each part of the tread portion is measured after the vehicle is traveled on a paved road at an average speed of 15 km/h for 1000 hours under tire load of 137 kN (78 kN when no load is mounted). Note that the values of the wear resistance and the partial wear resistance of Example tires 3-5 are converted and compared relative to those of Example 2, which is defined as 100. The greater value represents the more improvement in the wear resistance and the partial wear resistance. The evaluation results are shown in Table 4.

Heat radiation is evaluated such that the wheels are rotated at a speed of 15 km/h for 24 hours under tire load at 119 kN on a drum testing unit with a drum diameter of 5000 mm placed in a room at a temperature of 31° C., and temperature of the tires is measured by using a temperature measuring unit. Note that the values of the heat radiation of Example tires 3-5 are converted and compared relative to those of Example 2, which is defined as 100. The greater value represents the more improvement in the heat radiation. The evaluation results are shown in Table 4.

TABLE 4

| | Example tire 2 | Example tire 3 | Example tire 4 | Example tire 5 |
|---|---|---|---|---|
| Wear resistance | 100 | 95 | 100 | 100 |
| Partial wear resistance | 100 | 105 | 110 | 110 |
| Heat radiation | 100 | 100 | 100 | 100 |

As can be clearly appreciated from the results shown in Table 4, Conventional Example tires 2-5 exhibit substantially equal performance in terms of the wear resistance and the heat radiation. Further, in Example tires 3-5 having a larger width at the end portion on the road facing side of the inclined narrow groove than the groove width of the inclined narrow groove, the partial wear resistance is improved as compared with that in Example tire 2.

INDUSTRIAL APPLICABILITY

As can be clearly understood from the description above, according to the present invention, it is possible to provide a pneumatic tire having improved wear resistance and partial wear resistance while effectively improving heat radiation by optimizing a tread pattern.

The invention claimed is:

1. A pneumatic tire having, on a tread portion, two circumferential narrow grooves extending in a tire circumferential direction and arranged on both sides with respect to a tire equator plane, a central land portion defined by the circumferential narrow grooves, and two shoulder land portions outside of the two circumferential narrow grooves, comprising:

an inclined narrow groove provided, on the central land portion, with a first small groove extending along the tire circumferential direction, a second small groove extending from one end portion of the first small groove toward one of the circumferential narrow grooves so as to incline with respect to the tire circumferential direction, and a third small groove extending from the other end of the first small groove toward the other one of the circumferential narrow grooves so as to incline with respect to the tire circumferential direction;

wherein the first small groove is arranged on a circumference at equal pitches, and a distance of the first small groove in the tire circumference direction falls within 15-25% of a pitch length, wherein the second small groove and the third small groove extend from respective end portions of the first small groove toward the respective circumferential narrow grooves, and terminate within the central land portion, the second small groove and the third small groove being closed in the tire circumferential direction when contacted with a road surface, and the inclined narrow groove is arranged on the tire equator plane and extends to a position 12.5% or less of a tread width away from the tire equator plane on the outer side in a tire widthwise direction, wherein a length of the first small groove is shorter than each length of the second small groove and the third small groove, wherein each of the circumferential narrow grooves is arranged so as to be spaced away from the tire equator plane on an outer side in a tire widthwise direction by a distance of 25-60% of the tread width, and wherein the tire includes a plurality of narrow grooves inclined to the tire circumferential direction, the plurality of narrow grooves including the inclined narrow groove, and the plurality of narrow grooves are provided only in the central land portion;

wherein groove widths of the first small groove, the second small groove and the third small groove fall within 2.5-7.0 mm.

2. The pneumatic tire according to claim 1, wherein a groove width of each of the circumferential narrow grooves falls in 2.5-15.0 mm.

3. The pneumatic tire according to claim 1, wherein angles each formed by the second small groove and the third small groove with respect to the tire circumferential direction fall within 30-60°.

4. The pneumatic tire according to claim 1, wherein a depth of the circumferential narrow groove falls within 75-100% of a distance of a tread rubber of the tread portion in a tire radial direction.

5. The pneumatic tire according to claim 1, wherein a depth of the inclined narrow groove falls within 60-100% of a distance of a tread rubber of the tread portion in a tire radial direction.

6. The pneumatic tire according to claim 1, wherein an end portion on a terminating side of each of the second small groove and the third small groove is formed in a cylindrical shape having a diameter 3-5 times larger than groove widths of the second small groove and the third small groove.

7. The pneumatic tire according to claim 1, wherein the number of the inclined narrow groove to be arranged on the circumference falls within 32-40.

8. The pneumatic tire according to claim 1, wherein a width of an end portion on a road facing side of the inclined narrow groove is greater than a groove width at the other portions of the inclined narrow groove.

9. The pneumatic tire according to claim 8, wherein the end portion on the road facing side of the inclined narrow groove has a raised bottom portion formed in a stepped shape, as sectionally viewed in the tire widthwise direction.

10. The pneumatic tire according to claim 9, wherein a width of the raised bottom portion falls within 70-130% of a groove width at the other portions of the inclined narrow groove.

11. The pneumatic tire according to claim 9, wherein a depth of the raised bottom portion falls within 70-130% of a groove width at the other portions of the inclined narrow groove.

12. The pneumatic tire according to claim 9, wherein a width of the raised bottom portion falls within 3.0-6.0 mm.

13. The pneumatic tire according to claim 9, wherein a depth of the raised bottom portion falls within 3.0-6.0 mm.

14. The pneumatic tire according to claim 1, wherein the only grooves provided in the central land portion are a plurality of the inclined narrow groove.

* * * * *